(12) United States Patent
Miller et al.

(10) Patent No.: US 6,390,638 B1
(45) Date of Patent: May 21, 2002

(54) BULB WRAP USING EXPANDED POLYTETRAFLUOROETHYLENE

(75) Inventors: Brian Miller, Bowie; Kim Holcomb, Germantown; Bruce L. Davies, Pikesville, all of MD (US)

(73) Assignee: IDE, Inc., Baltimore, MD (US)

( * ) Notice: Subject to any disclaimer, the term of this patent is extended or adjusted under 35 U.S.C. 154(b) by 0 days.

(21) Appl. No.: 09/687,432

(22) Filed: Oct. 13, 2000

Related U.S. Application Data

(60) Provisional application No. 60/181,468, filed on Feb. 10, 2000.

(51) Int. Cl.[7] ................................................. F21V 7/04
(52) U.S. Cl. .............................. 362/31; 362/26; 362/27; 362/260; 362/341
(58) Field of Search ............................... 362/26, 27, 31, 362/260, 341

(56) References Cited

U.S. PATENT DOCUMENTS 6,015,610 A * 1/2000 Minor et al. ............. 428/315.7
6,108,060 A * 8/2000 Funamto et al. ............... 349/65

FOREIGN PATENT DOCUMENTS

JP 06-118243 4/1994

\* cited by examiner

*Primary Examiner*—Sandra O'Shea
*Assistant Examiner*—Ali Alavi
(74) *Attorney, Agent, or Firm*—Roberts Abokhair and Mardula, LLC

(57) ABSTRACT

A device for illuminating a flat panel display. The illuminating device has a flat light guide with light input edges and a light output surface, and light sources disposed at the light input edges. A layer of expanded PTFE is wrapped closely around the light sources, conforming to their exterior surface, and is spread across a back surface of the flat light guide. Reflector film layers (white and metallized) are wrapped over the layer of expanded PTFE. Preferably copper tape is then layered over the reflector film layers. Light is emitted from the light output surface when the light sources are energized.

6 Claims, 2 Drawing Sheets

BULB WRAP USING EXPANDED POLYTETRAFLUOROETHYLENE

CROSS REFERENCE TO RELATED APPLICATIONS

This application claims priority under 35 U.S.C. §119(e) from provisional application No. 60/181,468, filed Feb. 10, 2000. The 60/181,468 application is incorporated by reference herein, in its entirety, for all purposes.

BACKGROUND OF THE INVENTION

1. Field of the Invention

The present invention relates generally to the field of illumination. More particularly, the present invention relates to illumination of flat panel displays using elongate fluorescent light sources.

2. Background Information

Miniaturization has been a significant theme in the advance of information technology. One very important miniaturization advance has been the development of flat video display screens, which are capable of supplanting bulky cathode ray tube (CRT) video display screens.

This new display technology is commonly called flat panel display. Flat panel display technology has found applications in laptop computers, handheld personal digital assistants, desktop computer monitors, and flat panel televisions. The most obvious advantage of flat panel display over bulky CRT displays is space savings. However, it has been a developmental struggle for flat panel displays to efficiently match the brightness characteristics of CRTs. To come even close to the brightness performance of CRTs, flat panel displays generally need some sort of illumination structure added.

Flat panel displays fall into several broad categories, based on the type of illumination they employ. Some flat panel displays are internally self light emitting. An example of this category is a gas plasma display. Other flat panel displays are reflective. Flat panel displays in this category illuminate by reflecting an external light source back out from the display. Another category of flat panel displays are those that are transmissive. These displays transmit light through the display from a light source such as an edge light or a direct back light. A hybrid category of displays combine the actions of reflective displays and transmissive displays.

Miniature fluorescent bulbs are used as light sources in most flat panel display lighting applications. Miniature fluorescent bulbs are generally cylindrical and thin, about the diameter of a piece of spaghetti. Light from these bulbs is typically reflected by a lightweight material, such as white plastic, white polyester film (e.g., MYLAR™), or metallized polyester film (e.g., SILVERLUX™). The amount of power consumed by the lighting structure to obtain a desired level of display brightness is affected by the type of fluorescent bulb employed (hot cathode, cold cathode), the number of bulbs used, and the reflection efficiency of any reflecting structures used.

Direct back-lit illumination is a prior art transmissive illumination scheme that places an array of compact fluorescent directly behind an LCD panel. This tends to consume a large amount of energy because it requires a large number of bulbs to provide uniform illumination across the back of the LCD panel.

Illumination structures of the reflective, transmissive, and hybrid categories all use reflection structures of one sort or another. Two problems with prior art reflection structures that harm efficiency are (1) losses caused by leaking of light from the reflector and (2) losses caused by dissipation of light energy due to excessive bounces. The first problem can be characterized as the need to minimize light energy leakage loss. The second problem can be characterized as the need to minimize light energy dissipation loss.

Thus, what is needed is a reflecting scheme for use in flat panel illumination structures that minimizes losses of light energy due to both leakage and dissipation. What is also needed is a scheme to efficiently illuminate a flat panel display using miniature fluorescent bulbs.

SUMMARY OF THE INVENTION

It is an object of the present invention to provide an illumination structure for a flat panel display that maximizes efficient utilization of all the light energy emerging from the light sources.

It is another object of the present invention to provide a fluorescent illumination structure for a flat panel display that maximizes efficient utilization of all the light energy generated.

It is yet another object of the present invention to provide an edge-lit compact fluorescent bulb illumination structure that maximizes efficient utilization of all the light energy generated.

It is still another object of the present invention to provide a process for manufacturing an efficient edge-lit fluorescent illumination structure.

It is a further object of the present invention to provide a reflecting scheme for use in flat panel illumination structures that minimizes losses of light energy due to both leakage and dissipation.

It is a still further object of the present invention to maximize light efficiency from fluorescent bulbs while controlling heat transfer.

It is an additional object of the present invention to provide an illumination scheme that may be adapted to a wide variety of displays.

It is also an object of the present invention to provide an illumination scheme that can be implemented in a simple manner.

Some of the above objects are obtained by a device for illuminating a flat panel display. The illuminating device has a flat light guide with light input edges and a light output surface, and light sources disposed at the light input edges. The illuminating device also has a layer of expanded PTFE wrapped closely around the light sources, conforming to their exterior surface, and spread across a back surface of the flat light guide. The illuminating device further has one or more reflector film layers wrapped over the layer of expanded PTFE. Light is emitted from the light output surface when the light sources are energized.

Others of the above objects are obtained by a method for manufacturing an illumination device. The method includes disposing a light source at a light input edge of a flat light guide, and wrapping a layer of expanded PTFE closely around the light source. The method further includes spreading the layer of expanded PTFE across a back surface of the flat light guide, and wrapping one or more reflector film layers over the layer of expanded PTFE. Preferably, a layer copper tape is wrapped over the one or more reflector film layers.

BRIEF DESCRIPTION OF THE DRAWING

Additional objects and advantages of the present invention will be apparent in the following detailed description read in conjunction with the accompanying drawing figures.

DETAILED DESCRIPTION OF THE INVENTION

Figure 1:
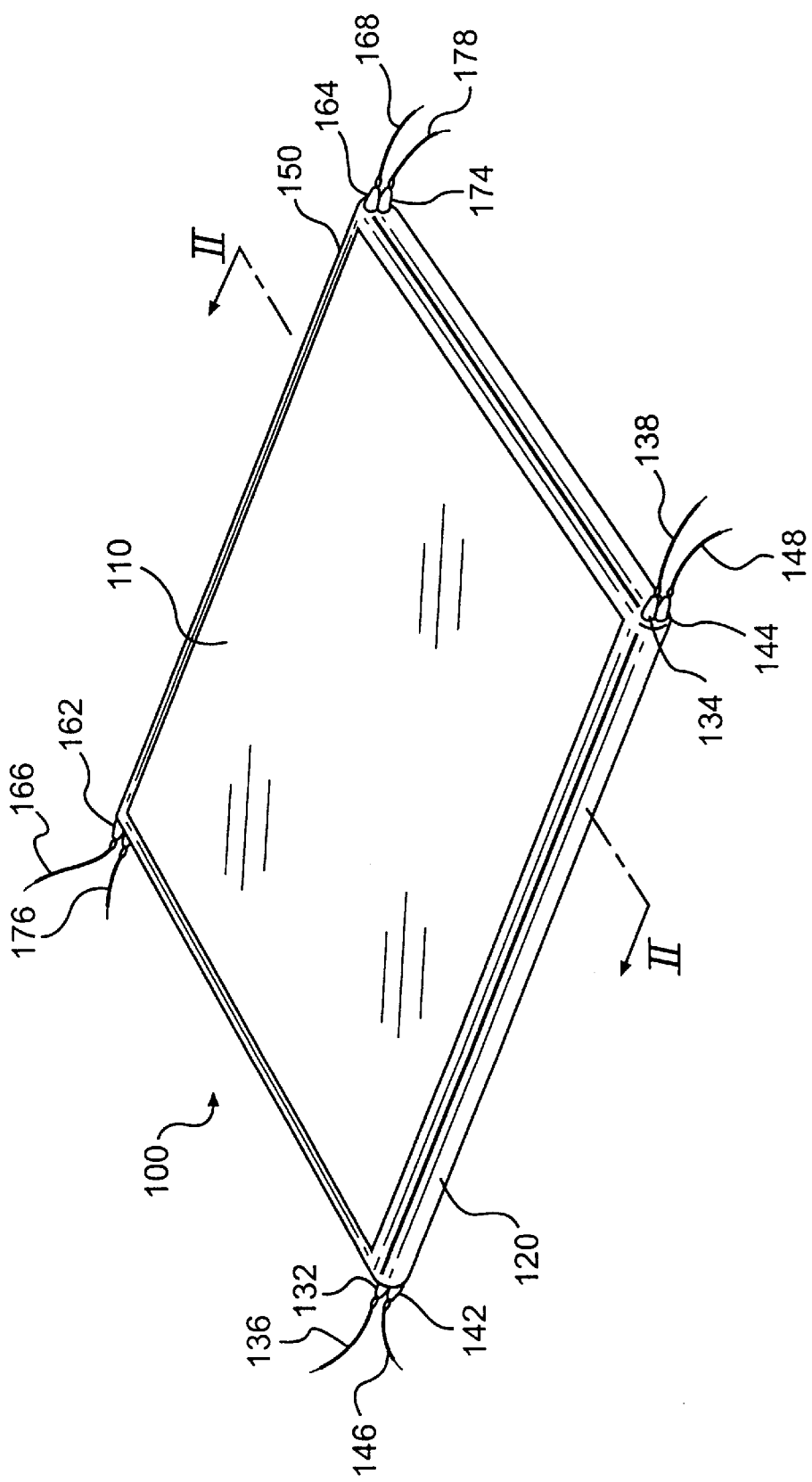
FIG. 1 illustrates a perspective view of an edge-lit illumination device according to an embodiment of the present invention.

In prior art illumination systems for flat panel displays, light energy is wasted from excessive reflection. The present invention employs expanded polytetrafluoroethylene (PTFE) as a reflecting medium. A sheet of expanded PTFE is wrapped intimately around the light sources. Use of this material is directed to an important object of the invention, which is to capture and use as much of the available light as possible.

Expanded PTFE has a near ideal Lambertian surface, which provides for a maximized reflection and diffusion. The reflectance of expanded PTFE exceeds 97% and its reflective diffusion properties are near perfect. The properties and virtues of a Lambertian surface are analyzed in detail by Ryer, Alexander D., Light Measurement Handbook, pp. 13, 23, 24 (1997), which is incorporated herein by reference in its entirety for all purposes.

Expanded PTFE is a pliable material. This means that it can be made to conform closely around compact fluorescent bulbs. By wrapping a sheet of expanded PTFE closely around a compact fluorescent bulb, a collimating reflector is formed.

Another advantageous property of expanded PTFE is that is resistant to high heat. Thus, it can be wrapped intimately around light sources that generate substantial heat, such as hot cathode fluorescent bulbs.

Expanded PTFE also ages very well in that it does not yellow or otherwise discolor over time, as do other plastics.

Placing the expanded PTFE reflector in direct contact with the light source bulbs, rather than spaced apart from them, less light energy is dissipated due to additional light bounces.

Another aspect of the present invention is the use of white polyester film as a reflector for a selected portion of the illumination structure. One problem with using expanded PTFE as a reflector is that it permits a small amount of light leakage via transmittance. In order to prevent this light energy from being lost, Applicant has discovered that backing the expanded PTFE wrap with a white polyester film is effective in preserving the light energy for illumination. The white polyester film is most effective when it is used to back the flat portion of the PTFE layer. MELENEX™ (manufactured by DuPont) is a commercially available white polyester film that is suitable for this purpose.

An additional aspect of the present invention is the use of metallized polyester film as a reflector for a selected portion of the illumination structure. Applicant has discovered that backing the expanded PTFE wrap with a metallized polyester film is also effective in compensating for the tendency of expanded PTFE to leak via transmission. Metallized polyester film is particularly suitable for wrapping around that portion of the PTFE wrap which curves over the bulbs. That is because metallized PTFE tends to curve and conform its shape readily to the underlying curved PTFE layer. SILVERLUX™ (manufactured by 3M) is a commercially available metallized polyester film that is suitable for this purpose.

A further aspect of the present invention is a set of film layers for enhancement of brightness output by the illumination structure. Generally, a suitable set of film layers for enhancing brightness include alternating brightness enhancement films with diffuser films to form a film pack. The brightness enhancing film layers act to bend the paths of incident light to be closer to normal to the plane of the film. The diffuser film layers act to diffuse the light distribution in order to prevent bright spots.

One other aspect of the present invention is the use of copper tape for the purpose of heat dissipation. An additional outer layer of copper tape is applied to the illumination device, around the light source bulbs, to dissipate excess heat from the bulbs. This accrues the benefits of increasing efficiency of the system, as well as lengthening the life of the bulbs.

Referring to FIG. 1, a perspective view of an illumination device 100 according to an embodiment of the present invention is illustrated. An illumination device 100 as illustrated is intended to underlie a flat panel display, such as an LCD panel (not shown). The top surface 110 of the illumination device is where light emerges to illuminate the display device above it. The illustrated illumination device 100 is an edge lit device, with light sources 130, 140, 160, 170 at opposing ends of a light pipe 210. A proximal edge 120 of the edge lit illumination device 100 contains a pair of light sources 130, 140. Power leads 136, 138, 146, 148 extend from the extreme ends 132, 134, 142, 144 of the light sources. A distal edge 150 of the edge lit illumination device 100 contains a pair of light sources 160, 170. Power leads 166, 168, 176, 178 extend from the extreme ends 162, 164, 174 of the light sources.

Figure 2:
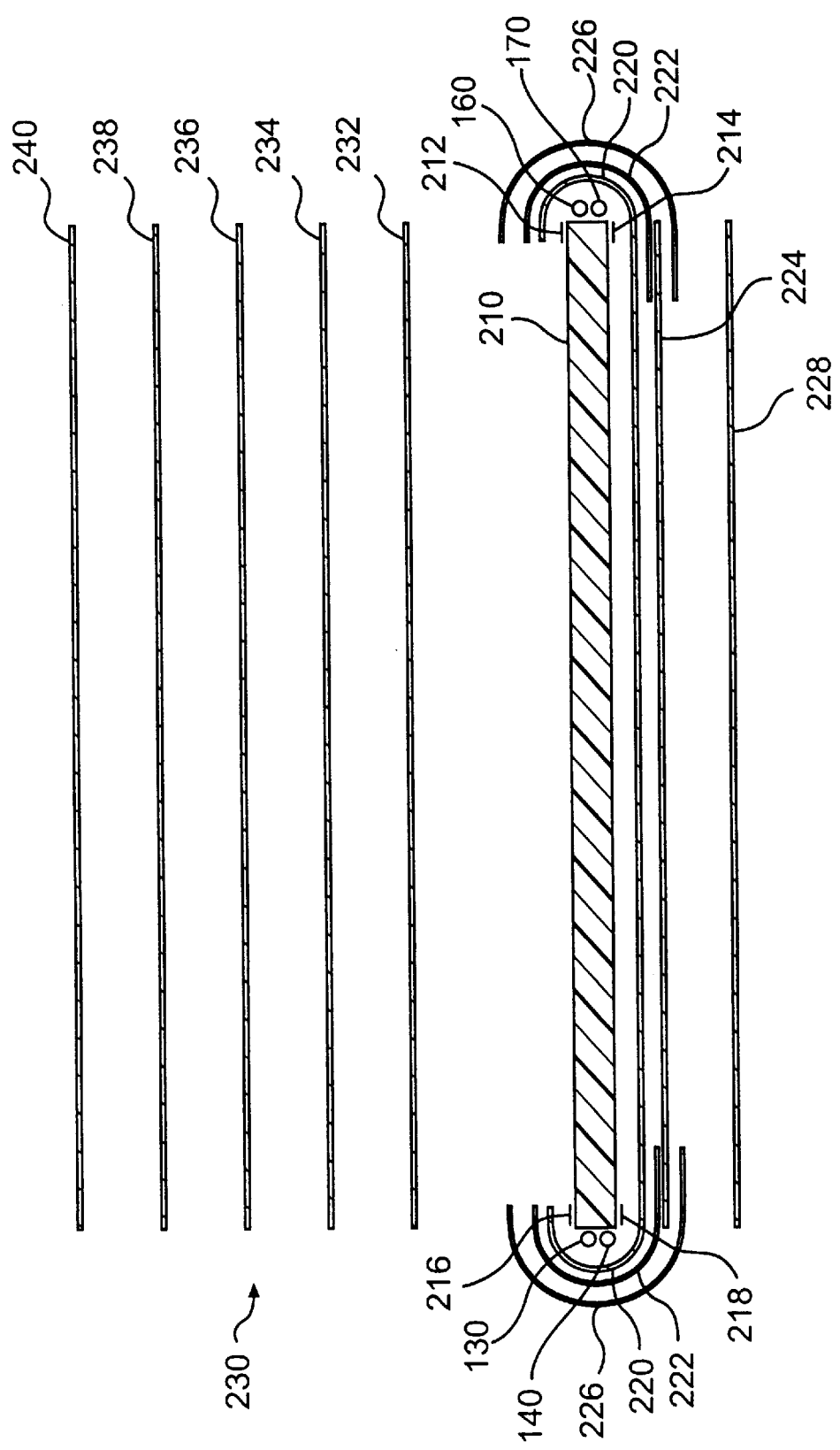
FIG. 2 illustrates a cross-section exploded view of the edge-lit illumination device of FIG. 1.

Referring to FIG. 2, a cross-section exploded view of the illumination device of FIG. 1 is illustrated. This view is "exploded" in the sense that the distinct layers of material are separated from one another for ease of illustration. In a working embodiment, the various layers are to be in intimate contact with one another.

The light sources 130, 140, 160, 170 are miniature cold cathode fluorescent bulbs (CCFTs) disposed at opposing ends of an acrylic light guide 210. Strips of pressure sensitive adhesive 212, 214, 216, 218 are placed near the edges of the light guide 210 to affix a flexible layer of expanded PTFE 220 around the light sources 130, 140, 160, 170 and along the back of the light guide 210. Two strips of SILVERLUX™ metallic polyester film 222 are wrapped about the opposed curved portions of the expanded PTFE wrap 220. The flat back portion of the layer of expanded PTFE 220 is backed by a layer of MELENEX™ white polyester film 224. Both the metallic film strips 222 and the white film 224 reflect leakage light back into the expanded PTFE layer 220. Testing has shown that use of these film materials as reflectors saves about 3–5% of the light energy that would otherwise be lost via leakage. Energy efficiency savings in this range are very significant in this art, where the devices are often battery powered.

Copper strips 226 are wrapped around the ends of the device, overlaying the reflector layers 222, 224. Copper is chosen for its high conductivity for purposes of dissipating heat generated by the light sources 130, 140, 160, 170. An additional, optional polyester film layer 228 may also be applied across the back of the illumination device.

A film pack 230 is laid over the top of the illumination device 100 for purposes of brightness enhancement. According to this embodiment, the first layer 232 is a diffuser film preferably TECRA™). The second layer 234 is a brightness enhancement film (preferably BEF II, manufactured by 3M Corp.) oriented at about 90 degrees. The third layer 236 is a brightness enhancement film (preferably BEF II, manufactured by 3M Corp.) oriented at about zero degrees. The fourth layer 238 is a diffuser film (preferably TECRA™). The fifth layer 240 is a dual brightness enhancement film (preferably DBEF, manufactured by 3M Corp.).

An illumination device embodied as described obtains a number of advantages. The light energy channeled to illuminate the flat panel display is maximized. Heat is controlled. The bulbs are protected from vibration. Brightness of flat panel displays is increased overall by 20–30 percent. The conforming nature of the expanded PTFE provides a natural formed collimator.

Another advantage of the above-described illumination device is that its increased brightness capabilities make a flat panel display employing it make the display useful for both daylight and night-vision applications. Dimming controls are used to adjust the light output of the bulbs to switch between the dual (night/day) operating modes. Conventional dimming controls that are well known in the art may be utilized in conjunction with an embodiment of the present invention to achieve this additional functionality.

The assembly procedure for an illumination device as described above obtains a number of advantages. The process of assembly of the device is simple. The process of assembly is cost effective. The assembly process is easily adapted to all types of flat panel displays.

The bulb wrap process described above is applicable in illumination devices of the transmissive, reflective, and hybrid categories.

An illumination system embodied according to the present invention is suitable for edge lit systems where there is only one bulb, tandem bulbs (as described above), or even clustered bulb configurations. It is also suitable for configurations where only one edge of the light pipe is lit, or multiple edges.

Although the embodiment described above uses cold cathode light sources, the invention works equally well for hot cathode light sources. The description above uses cold cathode sources because the market presently favors them over hot cathode fluorescent bulbs, primarily for energy consumption reasons.

The present invention has been described in terms of preferred embodiments, however, it will be appreciated that various modifications and improvements may be made to the described embodiments without departing from the scope of the invention.

What is claimed is:

1. A device for illuminating a flat panel display, the device comprising:

a flat light guide having one or more light input edges and a light output surface;

one or more light sources disposed at the one or more light input edges;

a layer of expanded PTFE wrapped closely around the one or more light sources and spread across a back surface of the flat light guide;

one or more reflector film layers wrapped over the layer of expanded PTFE;

wherein light is emitted from the light output surface when the one or more light sources are energized.

2. The device for illuminating a flat panel display as claimed in claim 1, wherein the one or more reflector film layers comprises a strip of metallized polyester film layered over the portion of the layer of expanded PTFE that wraps around the one or more light sources.

3. The device for illuminating a flat panel display as claimed in claim 1, wherein the one or more reflector film layers comprises a strip of white polyester film layered over the portion of the layer of expanded PTFE that is spread across the back surface of the flat light guide.

4. The device for illuminating a flat panel display as claimed in claim 1, wherein the one or more light sources comprise a miniature fluorescent bulb.

5. The device for illuminating a flat panel display as claimed in claim 1, the device further comprising:

copper tape layered over the one or more reflector film layers.

6. A method of manufacturing an illumination device, the method comprising:

disposing a light source at a light input edge of a flat light guide;

wrapping a layer of expanded PTFE closely around the light source;

spreading the layer of expanded PTFE across a back surface of the flat light guide;

wrapping one or more reflector film layers over the layer of expanded PTFE; and layering copper tape over the one or more reflector film layers.

* * * * *